US007753190B2

(12) United States Patent
Matheisl et al.

(10) Patent No.: US 7,753,190 B2
(45) Date of Patent: Jul. 13, 2010

(54) TRANSPORTATION DEVICE WITH DEFLECTOR APPARATUS

(75) Inventors: Michael Matheisl, Vosendorf (AT); Norbert Frim, Vienna (AT); Kurt Streibig, Rekawinkel (AT)

(73) Assignee: Inventio AG, Hergiswil (CH)

( * ) Notice: Subject to any disclaimer, the term of this patent is extended or adjusted under 35 U.S.C. 154(b) by 0 days.

(21) Appl. No.: 12/204,360

(22) Filed: Sep. 4, 2008

(65) Prior Publication Data

US 2009/0057097 A1 Mar. 5, 2009

(30) Foreign Application Priority Data

Sep. 5, 2007 (EP) .................................. 07115761

(51) Int. Cl.
*B65G 17/00* (2006.01)

(52) U.S. Cl. ....................................... 198/323; 198/326

(58) Field of Classification Search ................. 198/321, 198/323, 324, 326
See application file for complete search history.

(56) References Cited

U.S. PATENT DOCUMENTS 5,810,147 A * 9/1998 Vanmoor .................... 198/323
6,129,197 A * 10/2000 Gore .......................... 198/323
6,131,719 A * 10/2000 Gore .......................... 198/326
6,152,279 A * 11/2000 Davis ......................... 198/323
6,425,472 B1 7/2002 Davis et al.
6,581,748 B2 * 6/2003 Streibig et al. .............. 198/323
6,595,344 B1 7/2003 Davis et al.
2002/0179402 A1 12/2002 Streibig et al.

FOREIGN PATENT DOCUMENTS

JP 2003 182966 A 7/2003

* cited by examiner

*Primary Examiner*—James R Bidwell
(74) *Attorney, Agent, or Firm*—Ladas & Parry LLP

(57) ABSTRACT

An escalator or moving walk has respectively a step band and steps, or a moving walk with a pallet band and pallets. A balustrade has a handrail that is held by a balustrade skirt. Arranged on the balustrade skirt is a wedging guard apparatus or deflector apparatus that prevents wedging or pinching of objects and persons between the steps and the balustrade skirt. The wedging guard or deflector apparatus has a carrier or base section and a brush unit that is arranged on a vertical area of the balustrade skirt. The carrier or base section has fastening parts for vertical mating or joining with the brush unit.

10 Claims, 4 Drawing Sheets

TRANSPORTATION DEVICE WITH DEFLECTOR APPARATUS

The invention relates to an escalator or a moving walk with a step band with steps, or respectively with a pallet band with pallets, for the transportation of persons and/or objects, and with a balustrade with a handrail that is held by means of a balustrade skirt, wherein a deflector apparatus that is arranged on the balustrade skirt prevents wedging of body parts and/or objects between the step band that consists of the individual steps and the balustrade skirt. The deflector apparatus is arranged on a vertical area of the balustrade skirt and comprises a base section or deflector section and a brush unit.

BACKGROUND OF THE INVENTION

Transportation devices in the sense of the invention, which may also be referred to as mobility devices, are escalators and moving walks with a plurality of tread units, steps, or moving-walk pallets, respectively, which are joined to form an endless transporter. Users of the transportation device stand on the step surfaces of the steps or pallets or thread units.

Depending on the embodiment, there is a gap or air gap between the steps (or pallets) and a vertical area of the skirt panels on both sides of the transportation device. To prevent wedging in this gap or air gap, and/or penetration of objects, use is normally made of skirt brushes.

From patent document U.S. Pat. No. 6,131,719 a safety device has become known that prevents wedging between a step band that consist of individual steps and the skirt panels. The safety apparatus is conceived as a deflector consists of a large support section and various brush elements. The large support section is arranged on the balustrade skirt has, on the step side, a profiled opening, into which opening brush elements can be inserted. A brush element consists of a brush body that holds the brushes. The brush body is inserted from the front (from the step side) into the profiled opening of the large, robust support section. After installing of the brush element, a wedge element is pushed in from a support section end between the upper walls of the large support section and the brush body, the wedge element holding the brush body with a rib.

Further transportation devices with corresponding skirt brushes are known from patent documents EP 1 170 244, EP 1 262 441, EP 1 188 708, and DE 199 17 796, to cite some examples.

In what follows, EP 1 262 441 is taken as the prior state of the art. In that patent document, a deflector apparatus is described that is arranged on a vertical area of the balustrade skirt and comprises a deflector section and a brush unit. When being installed, the brush unit is inserted sideways into the massive, robust, large-area deflector section.

Disadvantageous in said safety devices is that their installation is elaborate and time-intensive. Other solutions are characterized as being easier to install. Disadvanageous here, however, is that the ease of installation is obtained at the cost of a not so robust and stable seating of the safety device.

BRIEF DESCRIPTION OF THE INVENTION

The present invention sets out to provide a remedy. The invention provides a solution for avoiding the disadvantages of the known devices, and creating a safety device that can be easily and quickly installed on the skirt of the escalator and nonetheless guarantees outstanding stability and robustness.

An escalator according to the invention, or a moving walk according to the invention, comprises a step band with steps or respectively a pallet band with pallets and a balustrade with a handrail that is held by means of a balustrade skirt. Arranged on the balustrade skirt is a deflector apparatus for the purpose of preventing wedging between the steps and the balustrade skirt. The deflector apparatus has a deflector section and a brush unit arranged on a vertical area of the balustrade skirt. The deflector section comprises means for easy or simple or fast vertical mating or joining of the brush unit with the deflector section.

The advantages achieved by means of the invention are mainly to be seen in that the brush units can be installed with little outlay, and that high strength or stability or robustness is nonetheless attained. Should a replacement of the brush units be necessary, the old brush units can be removed or exchanged with simple means or tools, and the new brush units can be toollessly installed on the existing deflector section by snapping or clicking. With a snapping device or clicking device according to the invention assembled by vertical mating or fastening, an endless deflector can be realized that is independent of changes of direction that are determined by the step run or pallet run.

BRIEF DESCRIPTION OF THE DRAWINGS

The invention is described in detail below in relation to examples and by reference to the annexed drawings, wherein.

DETAILED DESCRIPTION OF THE INVENTION

Figure 1:
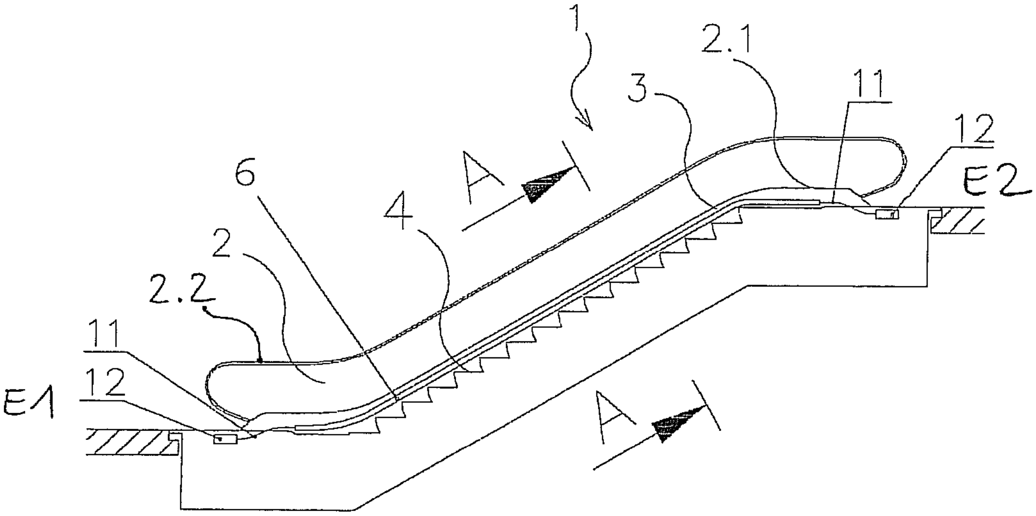
FIG. 1 is a diagrammatic side view of an escalator according to the invention.

FIG. 1 shows an escalator 1 that connects a first level E1 with a second level E2. The escalator 1 has a step band 4 that consists of steps 5. In the case of a moving walk, the step band and steps is replaced with a pallet band that consists of pallets. A handrail 2.2 is arranged on a balustrade 2, which at its lower end is, held by means of a balustrade skirt 3. The balustrade skirt 3 is supported or held by a support of the escalator 1 of the moving walk.

In the description that now follows, instead of the terms "escalator or moving walk", only the term "escalator" is used, but the embodiments apply analogously also for a moving walk, as the term is intended to embrace both escalators and moving walks. Thus, the term "step band" includes pallet bands, and the term "step" includes pallets in a moving walk.

Indicated in FIG. 1 is that a deflector apparatus 6 or wedging guard apparatus 6 (also referred to as brush unit or skirt unit) extends along the escalator 1. Details and various embodiments of this deflector apparatus 6 or wedging guard apparatus 6 are described in relation to the further figures.

Figure 2:
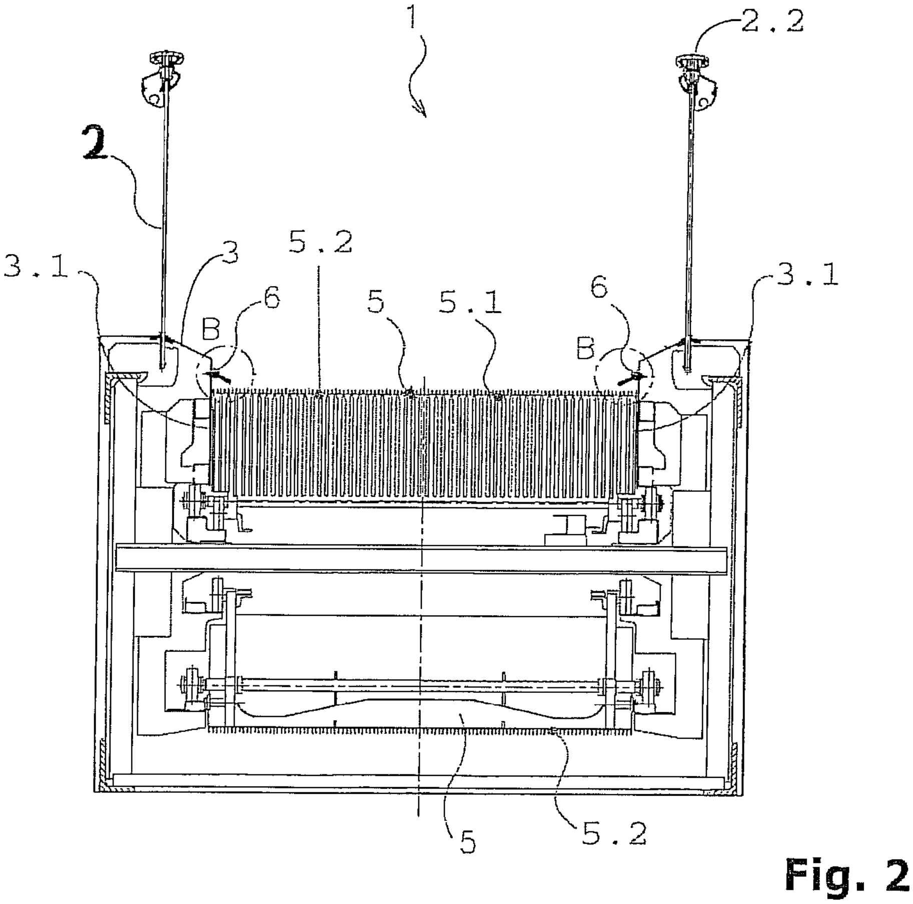
FIG. 2 is a cross-section taken along line A-A of FIG. 1.

FIG. 2 shows a cross-section along line A-A of FIG. 1. The upper part of the escalator 1 shows the advance motion of the step band 4. The steps 5 with a visible end part 5.1 (also referred to as a riser) and a step or tread surface 5.2 form a stairway. The lower part of the escalator 1 shows the return motion of the step band 4 and the steps 5 in which the tread surface 5.2 is facing downward. Step rollers that are arranged on cantilever beams are guided in a conventional manner by means of guides that are arranged on a support. Chain rollers that are arranged on a step axle are guided by means of further rails or guides that are arranged on the support, each step axle being joined to a drivable transportation chain. On the step side, the balustrade skirt 3 has a vertical skirt panel 3.1. Provided as safety device is a deflector or wedging guard apparatus 6 that prevents wedging or pinching of body parts and/or objects between the step band 4 consisting of the individual steps 5 or, respectively, the pallet band consisting of individual pallets, and the skirt panel 3.1.

Figure 3:
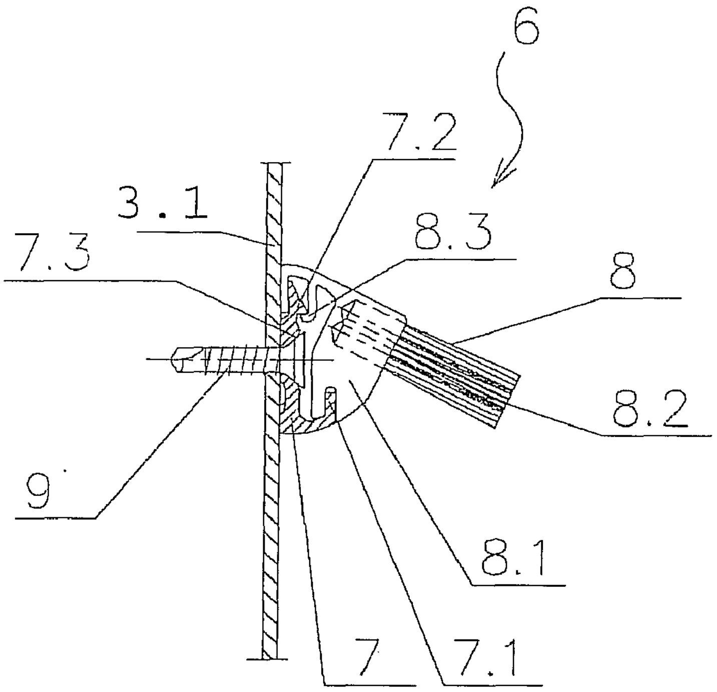
FIG. 3 is an enlarged view of section B of the escalator or moving walk with a first safety device according to the invention.

FIG. 3 shows the detail cutout B of FIG. 2 with the deflector apparatus 6 or wedging guard apparatus 6 according to the invention that comprises a deflector section/hollow base section/carrier section/foundation section 7 (also referred to as base section or brush holder section) and a brush unit 8 with brushes 8.2. According to the invention, the carrier or hollow section 7 is quasi a base section that is fastened to a vertical surface, preferably to the skirt panel 3.1.

The carrier or hollow section 7 is, for example, immovably connected to the skirt panel 3.1 by means of a screw 9. A corresponding pre-made screw recess in the hollow or carrier section 7 accepts the counter sunk head of the flat- or oval-head screw 9. The screw can be, for example a sheet-metal screw 9 or tapping screw or grooved screw or FDS flow-drilling screw or drill-head screw that is screwed into the skirt panel 3.1. Alternatively, cage nuts can be arranged on the skirt panel 3.1 to accommodate a metric screw 9. Sheet-metal screws 9 or tapping screws or grooved screws or FDS flow-drilling screws or drill-head screws or cage nuts and screws are arranged for engagement with the skirt panel 3.1 at certain distances along the entire step band 4.

Figure 6:
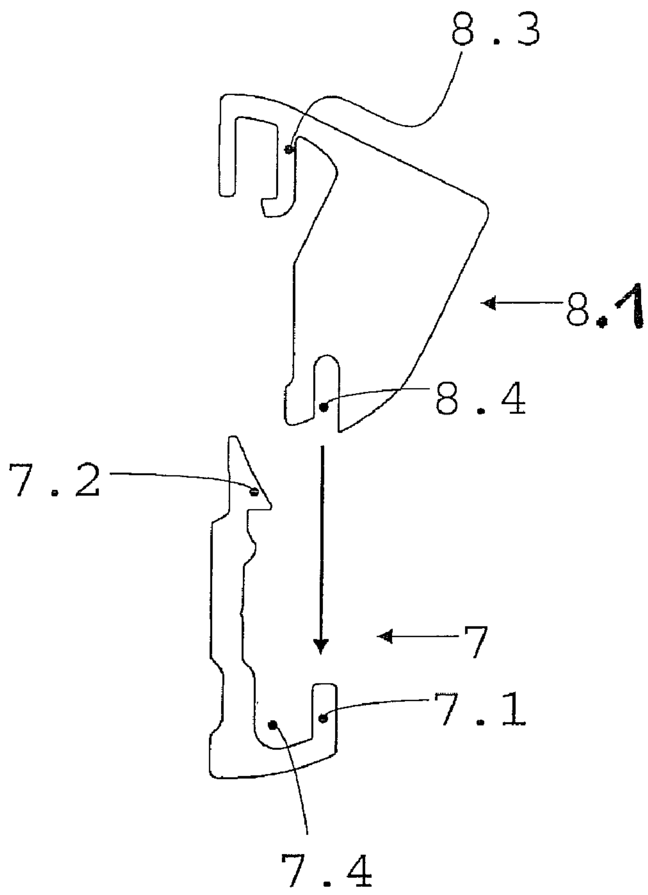
FIG. 6 depicts two sections of a safety device according to the invention in cross section before vertical mating.

The carrier section 7 has fastening means for vertically mating or vertically joining the brush unit 8. The operation of vertically mating or vertically joining is indicated in FIG. 6 by an arrow that points in the direction of mating.

According to the invention, when vertically mating or joining, the brush unit 8, or respectively a corresponding section thereof, is inserted into a lower brush carrier 7.1 and then the brush unit 8 or a corresponding section thereof is hooked into an upper hook-in apparatus 7.2 that is provided on the base or hollow section 7.

The base or hollow section 7 is designed so that forces acting from above onto the deflector apparatus 6 or wedging guard apparatus 6 are largely led into the lower brush carrier 7.1 and from there passed on or transferred to the skirt panel 3.1. While this happens, the brush unit 8 sits stably and immovably in the lower brush support 7.1.

The corresponding fastening means or fastening parts for the vertical mating are preferably realized in such manner that the foundation or base section 7 has both a lower brush carrier 7.1 and an upper hook-in device 7.2, while corresponding complementary elements are provided on the brush unit 8.

Preferably, the upper hook-in device 7.2 is designed for manual and/or instantaneous clicking or locking of the brush unit 8. Installation of the brush unit 8 on the deflector section 7 can thus take place without use of a tool or special tool.

Especially preferred is an embodiment in which the fastening means or fastening parts for vertical mating comprise a groove or joining groove 7.4 with a rail forming a vertically upward pointing nose 7.1 (see FIG. 6). This rail or elongated strip with nose or standing spring or spring serves as lower brush support and is referenced with the same reference number as the nose 7.1. Provided on the brush unit 8 is a complementary groove 8.4 (see FIG. 6) into which the nose or spring 7.1 engages or snaps.

The fastening means or fastening parts can further advantageously comprise an upper hook-in device 7.2 on the hollow base carrier section or foundation section 7 and a correspondingly downward pointing hook or engager 8.3 on the brush unit 8. When vertically mating or respectively vertically joining, this downwardly pointing hook 8.3 or engager 8.3 engages under the ledge of the upper hook-in device 7.2 (e.g. in the form of a barb). To allow clicking-in or snapping-in, either the upper hook-in device 7.2 and/or the hook 8.3 or engager 8.3 is/are executed partially elastically.

The carrier section 7 consists preferably of an endlessly produced material such as, for example, steel, aluminum, copper, or NIROSTA brand stainless steel, preferably in the form of a steel extruded or drawn section. A steel, aluminum, copper, NIROSTA or plastic section, or injection molded section, can also serve as the base or foundation section 7.

To further increase the safety of the transportation device and to reduce the risk of wedging, the invention contemplates that, light sources can be integrated into the deflector or wedging apparatus 6. Preferably, these light sources 10 are so designed that they extend along the transportation direction or transportation length or transportation section of the escalator. By this measure, the user of the transportation device can be warned of the gap or air gap that is concealed by the deflector apparatus 6 or wedging guard apparatus 6. In addition, the steps or pallets can be thereby illuminated, which helps to prevent, for example, false steps.

Figure 4:
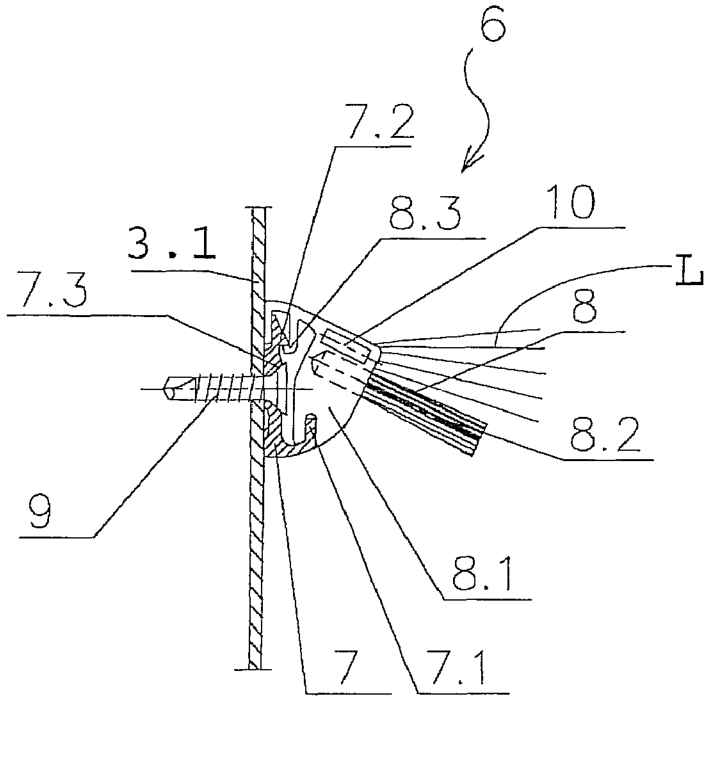
FIG. 4 is an enlarged view of section B of the escalator or moving walk with an alternative embodiment of a safety device according to the invention.
Figure 5:
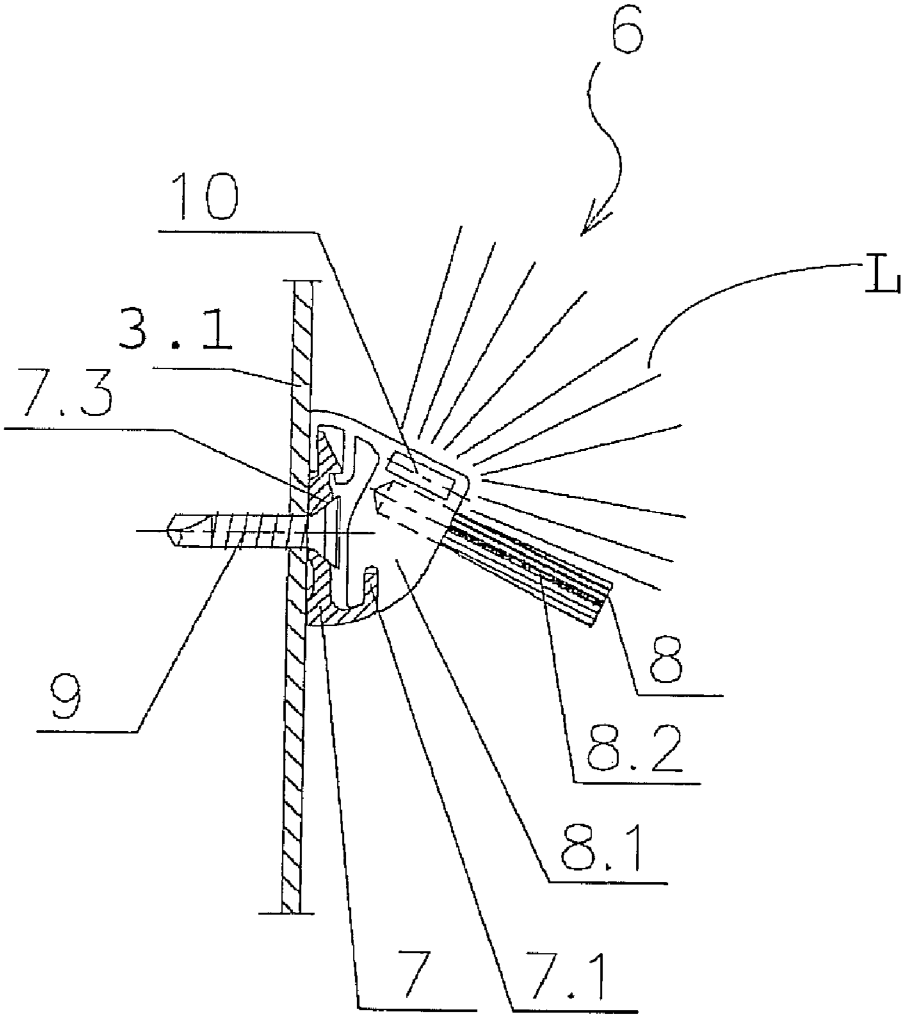
FIG. 5 is an enlarged view of section B of the escalator or moving walk with a further alternative embodiment of a safety device according to the invention.

Particularly preferred as light source 10 are LEDs (light emitting diodes) that are arranged above and along the wedging apparatus 6 or deflector apparatus 6. Preferably, these light emitting diodes sit on a printed circuit board, which can be rigid or flexible. This printed circuit board along with the light emitting diodes can be integrated into the body of the brush unit 8, as shown in FIG. 4 and FIG. 5. For light emitting diodes, use can be made of semiconductor diodes or, for example, also organic light emitting diodes (OLED).

In FIG. 4, it is shown in outline that the light emitting diode, which serves as light source 10, is oriented to radiate its illuminating power or light L in the direction of the brush 8.2.

The light source 10 can also, as shown in FIG. 5, radiate its light upwards and in the direction of the brush 8.2.

An embodiment that has also proven itself particularly well is one in which an oblong electroluminescent foil is integrated in the brush unit 8.

The electroluminescent foil is particularly suitable because it is a so-called Lambertian radiator. This means that the light density of the radiation that is emitted from the surface is the same viewed from all sides. The light radiates from the foil almost monochromically and very evenly. For the user of the escalator, it is thus highly visible and recognizable also at a large distance.

The electroluminescent foil can be regarded as a flat-surface light source 10 in the form of a foil. In a preferred embodiment, it is thinner than one to three millimeters and can be bent like paper. It illuminates homogeneously without glare spots and can, with a suitable control in a control cabinet 12 (see FIG. 1), be dimmed. The electroluminescent foil displays no evolution of heat, and consumes little energy, which is an enormous economic advantage. The service life is very high.

The light foils can be supplied in roll form and in lengths of up to 100 meters. This allows the required length to be simply constructed or readied, and advance preparation is advantageous and feasible.

The light foils have the advantage that as Lambertian radiators they are well visible even through smoke or fog, which in case of fire contributes very well to accident prevention and represents a major safety advantage for the users.

Preferably, individual shapes (lettering, symbols, logos, and brand names) can be integrated into the light foil.

Preferably, light sources 10 are used that emit light in green and blue hues so as not to dazzle the users of the escalator 1.

To allow the integration of light sources 10, either the entire brush section 8.1 is executed transparently, or at least the part through which the light L should or can emerge is executed transparently.

Figure 7:
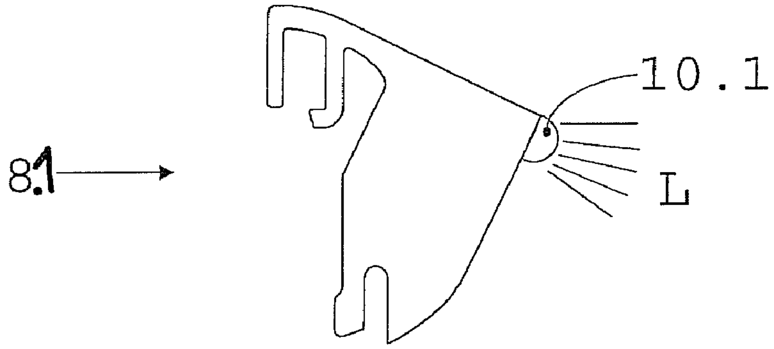
FIG. 7 depicts a brush section of the invention with a lens.

Shown in FIG. 7 is a further embodiment of a brush section 8.1 in which a lens 10.1 is provided for the purpose of radiating and/or fanning out the emerging light L as desired.

The electricity supply wires 11 may be arranged as outlined in FIG. 1, and a lighting control can be accommodated in a connection control cabinet 12. Preferably, the connection cabinet 12 or control cabinet 12 is placed or installed in a location that is easily accessible for service and/or inspection purposes.

The integration of light sources 10 allows the targeted illumination of the transportation device or travel device and thereby increases the safety of the users.

Depending on need, the brush unit 8 can be installed cut to length, which means in shorter length sections, in partial sections, or endlessly.

A particular advantage of the vertically joined or vertically mated skirt brushes 6 or wedging guard apparatus 6 lies in their easy installability and in their better absorption of the loads and forces. Furthermore, the brush support 7.1 and the carrier section 7 can be more solidly and robustly executed. In addition, through the barb 7.2, a snug engagement of the brush unit 8 or of the brush section 8.1 is assured.

Especially preferred is a brush unit 8 that is made of plastic, for example in an injection molding process or extrusion process. Preferably, the brushes 8.2 are integrated into the brush unit 8 during manufacture, but a subsequent brush fitting is possible and conceivable and feasible.

As described, the invention can be equally applied to escalators and moving walks.

We claim:

1. An escalator, comprising:

a step band having steps;

a balustrade having a handrail, the balustrade being held by a balustrade skirt; and a deflector guard apparatus arranged on the balustrade skirt to prevent wedging between the steps and the balustrade skirt, the deflector guard apparatus having arranged on a vertical area of the balustrade skirt a carrier section, a brush unit, and fastening means configured to vertically mate and join the brush unit to the carrier section, the fastening means comprising a lower brush support and an upper hook-in device on the carrier section and corresponding complementary elements on the brush unit, the lower brush support and upper hook-in device being configured to allow the brush unit to be inserted into the lower brush support prior to a hooking engagement between the brush unit and the upper hook-in device.

2. The escalator according to claim 1, wherein the upper hook-in device comprises a manual click-engagement arm for the brush unit.

3. The escalator according to claim 1, wherein the carrier section is in the form of a strip with a vertically upward pointing nose.

4. The escalator according to claim 1, wherein the brush unit has a downward-pointing barb to engage a lower surface of the upper hook-in device.

5. The escalator according to claim 1, wherein the carrier section is formed as a strip with a vertically upward pointing nose.

6. The escalator according to claim 2, wherein the carrier section is formed as a strip with a vertically upward pointing nose.

7. The escalator according to claim 2, wherein the brush unit has a downward-pointing barb to engage a lower surface of the upper hook-in device.

8. An escalator, comprising:

a step band having steps;

a balustrade having a handrail, the balustrade being held by a balustrade skirt;

a deflector guard apparatus arranged on the balustrade skirt to prevent wedging between the steps and the balustrade skirt, the deflector guard apparatus having arranged on a vertical area of the balustrade skirt a carrier section, a brush unit, and fastening means configured to vertically mate and join the brush unit to the carrier section; and light sources integrated in the deflector apparatus, the light sources extending along a transportation length or section of the escalator.

9. The escalator according to claim 8, wherein the light sources are integrated in the brush unit.

10. The escalator according to claim 8, wherein the light sources comprise light emitting diodes or an electroluminescent tape.

* * * * *